UNITED STATES PATENT OFFICE.

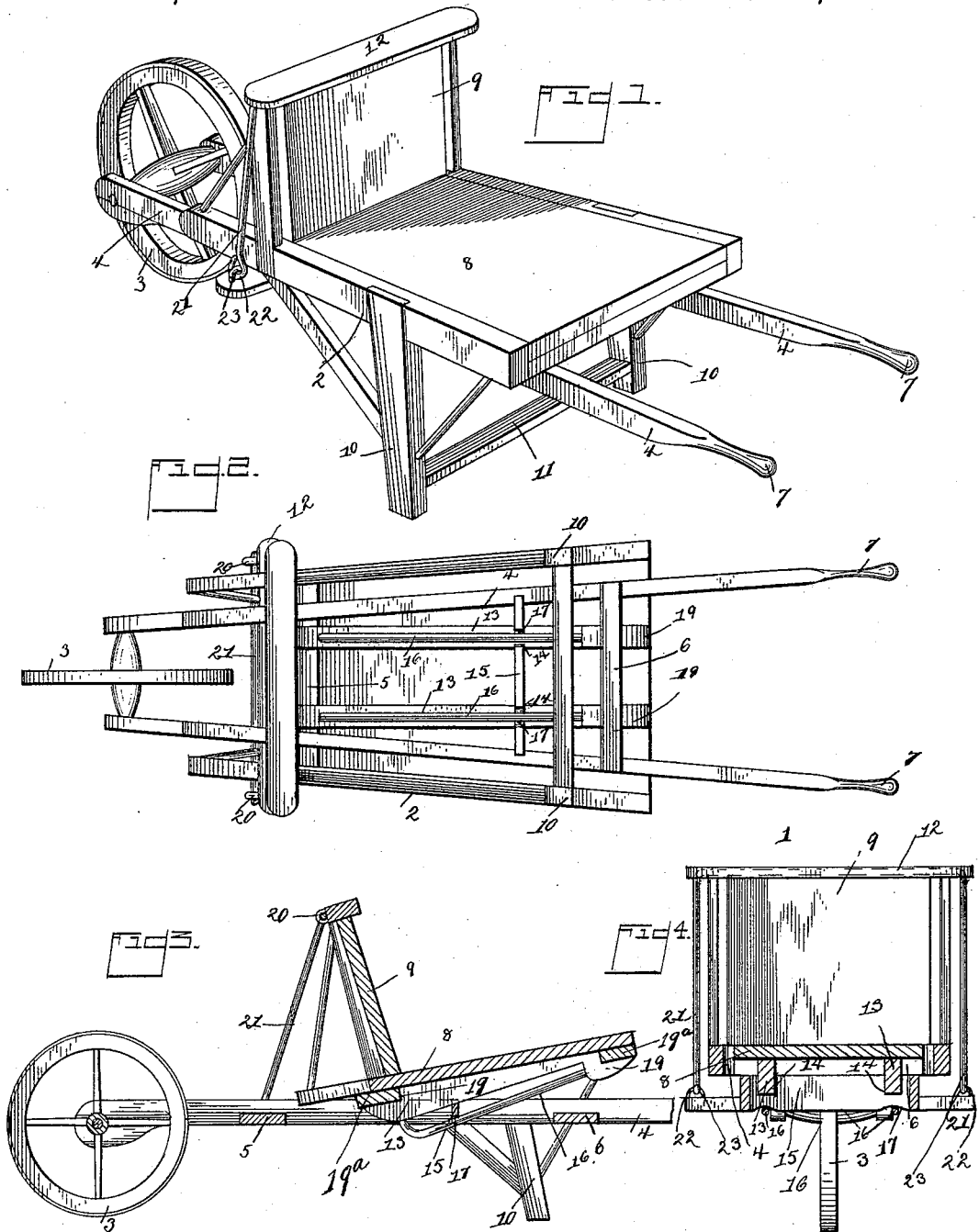

FRANCIS H. BIRD, OF LAZEARVILLE, WEST VIRGINIA.

WHEELBARROW.

SPECIFICATION forming part of Letters Patent No. 466,001, dated December 29, 1891.

Application filed May 15, 1891. Serial No. 392,887. (No model.)

*To all whom it may concern:*

Be it known that I, FRANCIS H. BIRD, a citizen of the United States, residing at Lazearville, in the county of Brooke and State of West Virginia, have invented a new and useful Wheelbarrow, of which the following is a specification.

The invention relates to improvements in wheelbarrows.

The object of the present invention is to simplify and improve the construction of wheelbarrows and to enable the same to be readily moved over obstructions, such as curbstones, steps, and the like.

The invention consists of the construction and novel combination and arrangement of parts hereinafter fully described, illustrated in the accompanying drawings, and pointed out in the claims hereto appended.

In the drawings, Figure 1 is a perspective view of a wheelbarrow constructed in accordance with this invention. Fig. 2 is a reverse plan view. Fig. 3 is a central vertical sectional view. Fig. 4 is a transverse sectional view.

Referring to the accompanying drawings, 1 designates a wheelbarrow-truck, upon which is mounted a wheelbarrow body or frame 2, adapted to slide on the truck to shift the position of the load and to enable the truck to be moved independently of the load to bring the wheel 3 upon a curbstone, step, or similar obstruction. The truck consists of handle-bars 4, arranged at a slight angle and connected by cross-bars 5 and 6, and having their rear ends shaped into handle 7 and their front ends provided with bearings to receive the axle of the wheel 3.

The wheelbarrow body or frame is constructed in the ordinary manner and is capable of a limited longitudinal movement on the truck, and consists of a bottom 8, a front board 9, and legs 10, and is adapted to receive sides in the usual manner. The legs 10 are connected by a bar 11 and are supported by inclined braces, and the front board has its top bar 12 suitably braced. Secured longitudinally of the bottom and arranged on the lower face are two parallel bars 13, which engage recesses 14 of a cross-piece 15 of the truck, and are provided with two guide-wires 16, which engage notches 17 in the lower edge of the said cross-piece 15, and the said wires and bars 13 serve to guide the movements of the wheelbarrow frame and the truck and prevent them slipping laterally on each other and upsetting the wheelbarrow, and the bars 13 are provided in their upper edges with shoulders 19, arranged at the ends and adapted to fit against bottom cross-bars $19^a$ of the wheelbarrow-frame. The cross-piece 15 has its ends arranged in suitable grooves of the handle-bars 4, and the wires 16 have their rear ends arranged in sockets of shoulders 19 of the bars 13, and their front ends are bent upward and secured to the bars 13.

The top bar 12 of the wheelbarrow-frame is provided on its front edge with eyes 20, which form bearings for a U-shaped wire 21, which has its cross-piece arranged in the said eyes 20, and is provided at its ends with hooks 22, which engage eyes 23, arranged on the upper faces of the extended ends of the front cross-bar 5 of the truck.

When it is desired to roll the wheelbarrow over a curbstone, step, or similar obstruction, the wheel is moved up against the obstruction and the rear ends of the handle-bars are depressed to elevate the wheel, and the truck is moved forward under the wheelbarrow-frame to carry the wheel upon or over the obstruction. By lifting the rear ends of the handle-bars the wheelbarrow-frame, with its load, is caused to slip forward down the inclined handle-bars and assume its normal position.

It will be seen that the wheelbarrow is simple and inexpensive in construction, and is adapted to be conveniently moved over a curbstone, steps, and similar obstructions.

The body of the bar 13 is approximately triangular, and when the truck is moved forward in passing over an obstruction the load and wheelbarrow-frame are slightly raised, which causes them to readily slide forward on the handle-bars and resume their normal position after the wheelbarrow has passed the obstruction.

What I claim is—

1. A wheelbarrow comprising the truck, and a body or frame mounted thereon and provided with a longitudinally-disposed guide-rod engaging the truck, substantially as described.

2. The combination, in a wheelbarrow, of the truck having a cross-piece provided in its upper edge with a recess having its lower edge with a notch, the wheelbarrow-frame loosely mounted on the truck, the bar 13, secured to the lower face of the wheelbarrow-frame and engaging the recess of the cross-piece, and the guide-rod 16, secured to the bar 13 and engaging the notch of the cross-piece, substantially as described.

3. The combination of the truck provided with eyes, the wheelbarrow-frame loosely mounted on the truck and capable of a limited longitudinal movement, and the U-shaped wire 21, journaled on the wheelbarrow-frame and provided at its ends with hooks to engage the said eyes, substantially as described.

4. The combination of the truck provided with eyes, the cross-piece 15, secured to the truck and provided in its upper edge with a recess and in its lower edge with a notch, the wheelbarrow-frame arranged on the truck, the U-shaped wire journaled on the front of the wheelbarrow-frame and provided at its ends with hooks to engage the said eyes, the bar 13, secured to the lower face of the bottom of the wheelbarrow-frame and extending longitudinally of the same and being approximately triangular and engaging the recess of the cross-piece, and the guide-rod 16, secured to the bar 13 and engaging the notch of the cross-piece, substantially as described.

In testimony that I claim the foregoing as my own I have hereto affixed my signature in presence of two witnesses.

FRANCIS H. BIRD.

Witnesses:
S. G. WANGLE,
B. AXTELL.